No. 644,485. Patented Feb. 27, 1900.
R. E. WOODSON.
NUT CRACKING MACHINE.
(Application filed Jan. 18, 1897.)
(No Model.) 4 Sheets—Sheet 1.
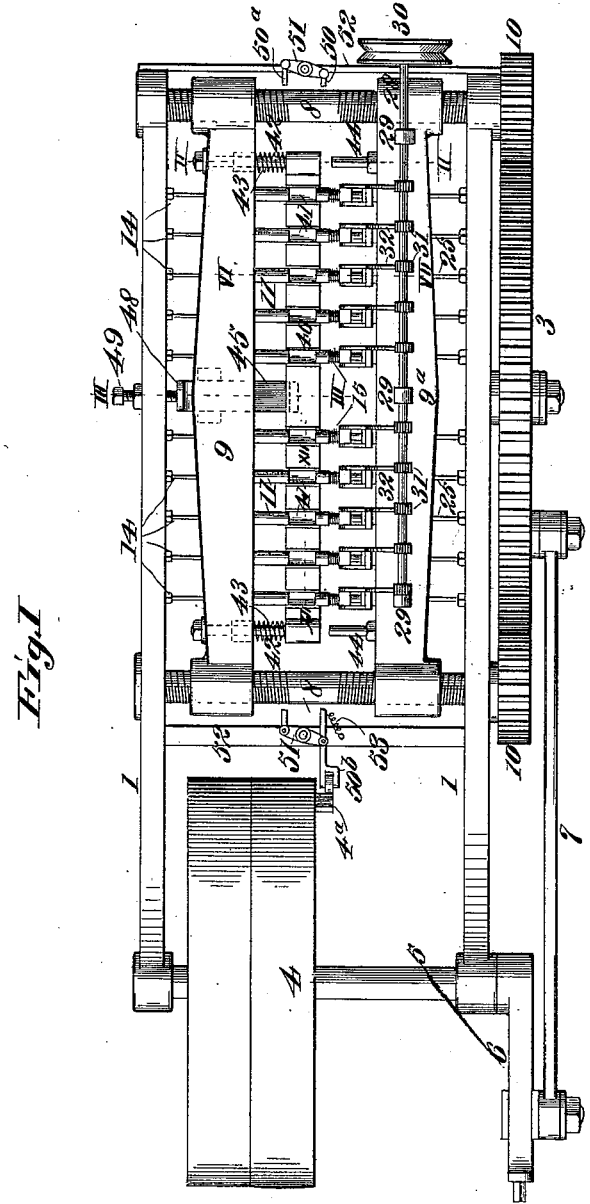
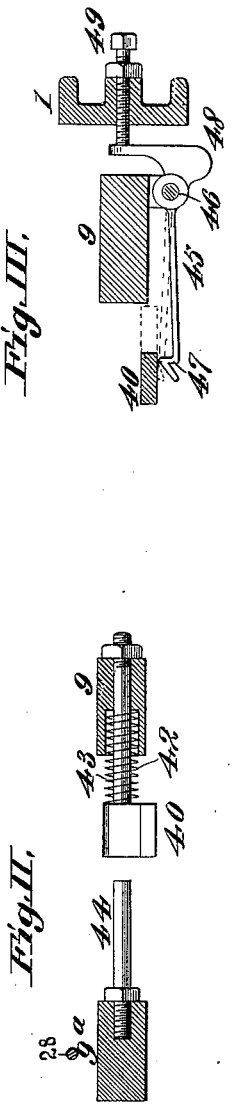
Attest:
E. S. Knight
N. Finley
Inventor:
Robert E. Woodson
By Knight Bro
Atty's No. 644,485. Patented Feb. 27, 1900.
R. E. WOODSON.
NUT CRACKING MACHINE.
(Application filed Jan. 18, 1897.)
(No Model.) 4 Sheets—Sheet 2.
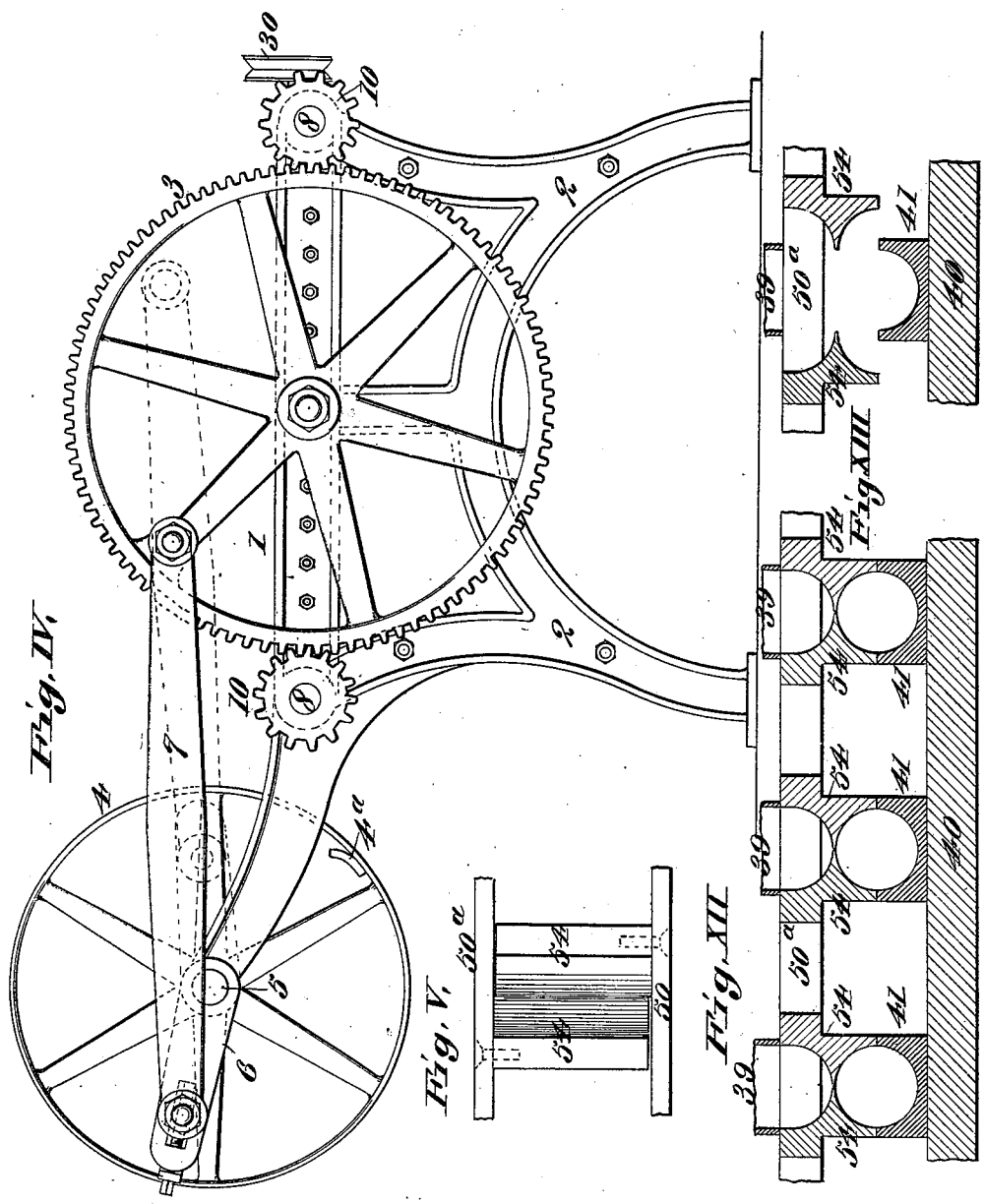
Attest:
E. S. Knight
N. Finley
Inventor:
Robert E. Woodson
By Wright Bro.
Atty's

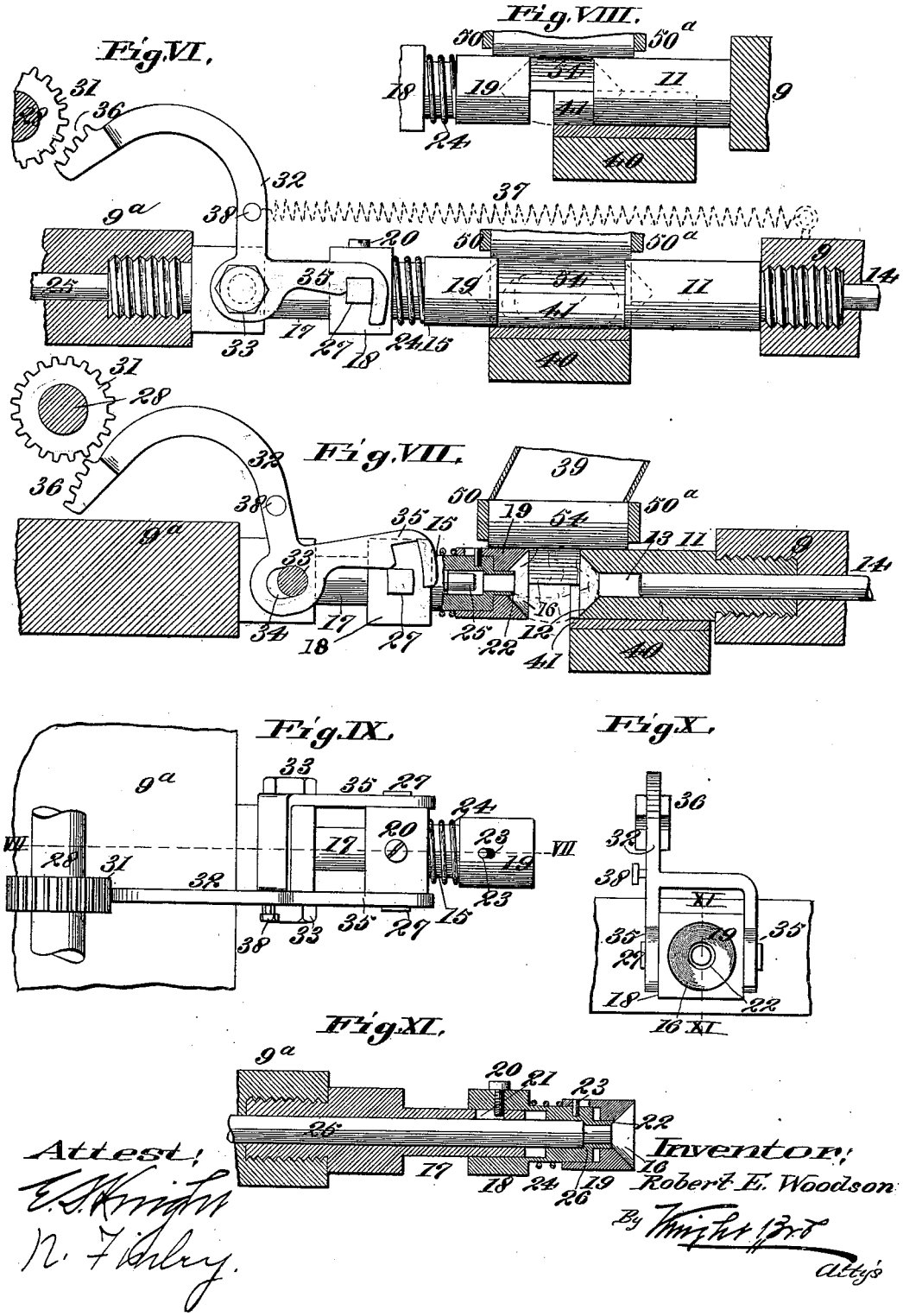

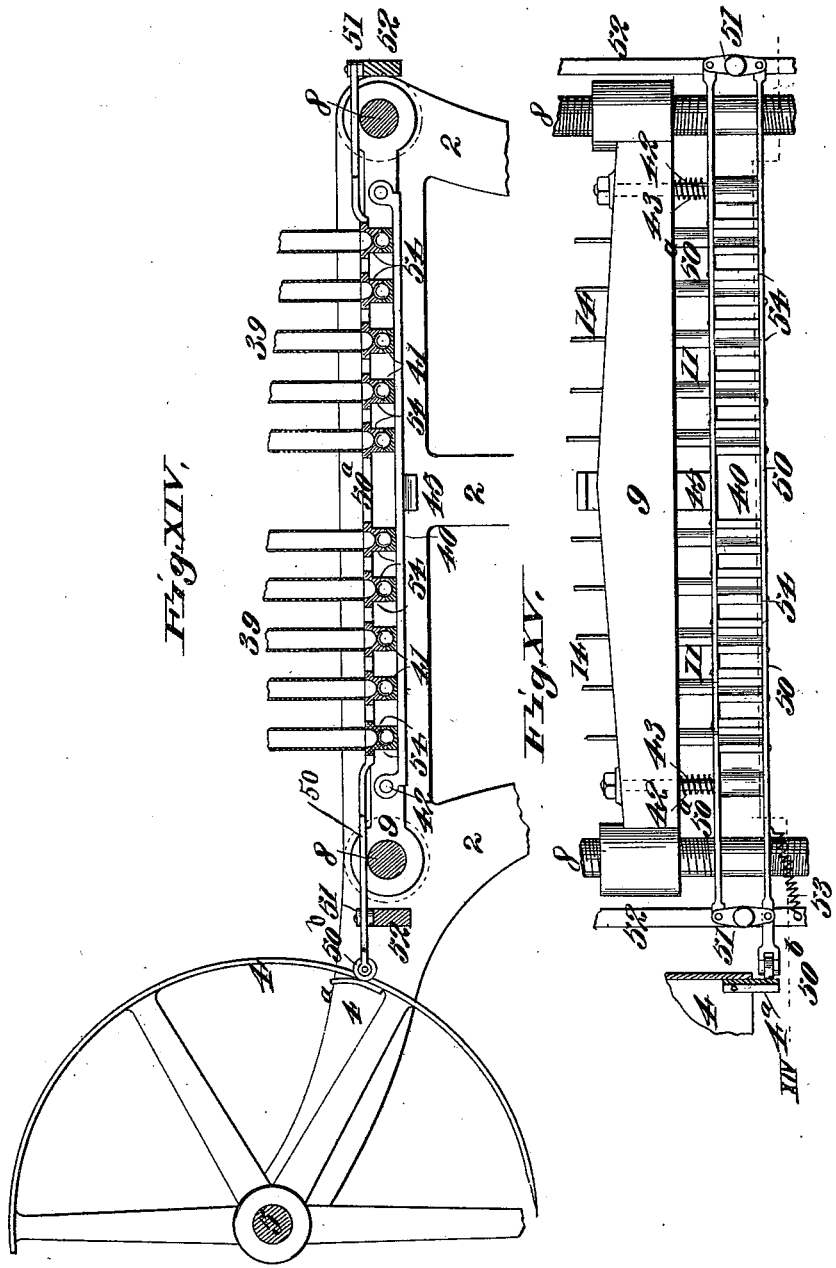

UNITED STATES PATENT OFFICE.

ROBERT E. WOODSON, OF ST. LOUIS, MISSOURI.

NUT-CRACKING MACHINE.

SPECIFICATION forming part of Letters Patent No. 644,485, dated February 27, 1900.

Application filed January 18, 1897. Serial No. 619,691. (No model.)

*To all whom it may concern:*

Be it known that I, ROBERT E. WOODSON, a citizen of the United States, residing at the city of St. Louis, in the State of Missouri, have invented a certain new and useful Improvement in Nut-Cracking Machines, of which the following is a full, clear, and exact description, reference being had to the accompanying drawings, forming a part of this specification.

My invention relates to a machine for cracking edible nuts, the construction of the machine being such that the nuts are fed automatically and the cracking accomplished by a series of jaws to which the nuts are fed from a suitable hopper.

My invention consists in features of novelty hereinafter fully described, and pointed out in the claims.

Referring to the drawings, Figure I is a top view of the machine. Fig. II illustrates a section taken on line II II, Fig. I. Fig. III illustrates a section taken on line III III, Fig. I. Fig. IV is a side elevation of the machine. Fig. V is an enlarged detail top view of one of the feed-shuttles. Fig. VI is a side view of the jaws open. Fig. VII illustrates a vertical section taken in part on line VII VII, Fig. IX, showing the cracking-jaws in forward position in the act of cracking a nut. Fig. VIII is a view illustrating the shuttle partially retracted after receiving a nut to be cracked. Fig. IX is a detail top view of one of the adjusting-jaws and its locking and tripping device. Fig. X is a face view of the parts shown in Fig. IX. Fig. XI illustrates a vertical section taken on line XI XI, Fig. X. Fig. XII illustrates an enlarged cross-section through a portion of the feed-shuttles, the shuttle-jaws being closed. Fig. XIII illustrates an enlarged cross-section of one of the feed-shuttles in open position. Figs. XIV and XV are respectively a longitudinal section of the machine and a plan.

In the drawings, 1 designates the frame of the machine, supported by legs 2.

3 designates the master-wheel, driven by a drive-pulley 4 on a shaft 5, from which connection is had to the master-wheel by a crank 6 and pitman 7.

8 8 designate screw-rods journaled in the frame 1, that at respective ends are provided with right and left threads.

9 $9^a$ are cross-bars the ends of which are bored and tapped with right and left screw-threads corresponding to the right and left screw-threads of the rods 8 upon which they operate. By the employment of the right and left screw-threads the cross-bars 9 $9^a$ are caused to travel to and from each other on the turning of the rods 8. The rods 8 are operated through means of pinions 10 10 upon their ends, which pinions mesh with the teeth of the master-wheel 3. It will be seen that as the master-wheel is greater in circumferential diameter with relation to the length of the crank 6 the movement of the crank 6 will only cause the master-wheel to travel a portion of a revolution, when its direction of travel will be reversed, thereby imparting to the master-wheel an oscillatory instead of a revolving movement. Thus it is that the rods 8 are turned alternately first in one direction and then the other, causing the cross-bars 9 $9^a$ to alternately move toward and from each other continuously.

The cross-bar 9 carries jaws 11, the ends of which are provided with concave mouths 12 of a suitable shape and dimension to each receive one of the ends of the nuts to be cracked. These jaws are provided with longitudinal bores 13.

14 are plungers attached to the frame 1 of the machine and working through the cross-bar 9 and through the bores 13 for the purpose of discharging from the mouths of the jaws any particles of shells that may become lodged therein.

15 designates jaws carried by the cross-bar $9^a$, the outer members of which are provided with concave mouths 16, similar to the mouths 12 of the jaws 11. The jaws 15 are loosely connected to their shanks 17, carried on the cross-bar $9^a$. Each jaw 15 is composed of members 18 19, the member 19 of which is the portion that is provided with the nut-receiving mouth 16. The member 18 is connected to the shank 17 by means of a screw 20, the point of which enters and is adapted to move in a groove 21 in the shank 17, thereby permitting a limited movement of the member 18 upon the shank. The outer end of the member 18 is reduced in size and formed into a circular knife 22, that in normal position lies at the base of the mouth 16 of the member 19, but is arranged to protrude into said mouth in the action of cracking a nut for the purpose of cutting the shell. The member 19 is connected to the member 18 by means of a slot-and-pin connection 23, thereby providing for a limited movement of the member 19 upon the member 18, and said member 19 is backed by a coil-spring 24, whose office is to return the member 19 to its normal position.

25 designates plungers, one end of each of which is attached to the frame 1 of the machine and the opposite ends of which pass through the cross-bar 9ª and through bores in the shank 17 and members of the jaw 15. The forward ends of these plungers are reduced in size, forming shoulders 26, that bear against shoulders in the bore of the member 18 and return said member to its forward position on the return movement of the jaws after the operation of the machine in the act of cracking nuts, the ends of the plungers at the same time moving into the mouths 16 of the jaws and expelling any particles of shell that may have become lodged therein.

The member 18 of the jaw 15 carries upon its sides studs or projections 27.

28 designates a shaft journaled in posts 29, carried upon the cross-bar 9ª. This shaft is provided at one end with a drive-pulley 30, and rigidly mounted upon it are toothed wheels 31. The pulley 30 is preferably driven by a belt running upon a counter-shaft pulley located above the machine, which is not shown, but the arrangement of which is readily conceived.

32 designates rocking bars pivoted to the shanks 17 of the jaws 15 by bolts or pins 33. The pivot-pin openings 34 in the rocking bars are elongated, allowing for a limited movement of the rocking bars upon their pivots. The inner ends of the rocking bars are provided with hooks 35, that are arranged to engage the studs 27 upon the movable members 18 of the nut-cracking jaws 15. The opposite ends of the rocking bars are provided with toothed segments 36, that stand free from engagement with the toothed wheels 31 when the jaws 15 are in their forward position and the hooks 35 are in engagement with the studs 27; but in the act of cracking nuts between the jaws 11 and 15 pressure of the larger nuts against the jaws 15 carries said jaws backward, in which movement the rocking bars 32 are carried the distance permitted by the elongated openings 34 of their pivots, moving them from the position shown in Fig. VI to that shown in Fig. VII. The shaft 28 being constantly in motion, as soon as the rocking levers 32 are moved into the position shown in Fig. VII the teeth of the segments 36 come into engagement with the teeth of the wheels 31, and the result is that the outer ends of the rocking bars are thrown downward and the hooks 35 are raised and released from engagement with the studs 27.

37 designate springs, one end of each of which is connected to the cross-bars 9 and the opposite end connected to studs 38 on the rocking bars 32. These springs serve to draw the rocking bars forward on their being released from engagement with the toothed wheels 31.

The object of the arrangement just described is to permit the cracking of nuts of various sizes or lengths with equal facility without mashing the larger or longer nuts, which would be the result if the jaws 11 and 15 were both rigid.

39 designates chutes or slideways through which the nuts are conveyed singly from a suitable hopper to the cracking-jaws.

40 designates a shuttle-bar the upper surface of which is provided with nut-receiving pockets 41, arranged beneath the nut-cracking jaws. The shuttle-bar 40 is supported upon rods 42, attached to the cross-bar 9, around which rods and between the shuttle-bar and cross-bar 9 are spiral springs 43, the tendency of which is to press the shuttle-bar forward.

44 designates pins carried by the cross-bar 9ª. The pins act to retract the shuttle-bar as the jaws approach each other, as will be hereinafter described.

45 designates a dog pivoted at 46 to the under side of the cross-bar 9, the forward end of this dog being provided with a hook 47, and its heel 48 is weighted to give it an increased gravitating tendency over the forward hook end of the dog. Bearing against the heel of the dog is a set-screw 49, inserted in the frame 1 of the machine. This screw is arranged to limit the downward movement of the heel 48.

Assuming the shuttle-bar to be in the position shown in Figs. I and VI, in which the jaws are apart and ready to receive a series of nuts to be cracked, the machine being put in motion by power applied to the drive-pulley 4, the master-wheel 3 is rotated and the cross-bars 9 9ª are caused to travel toward each other, carrying the cracking-jaws with them. As the nuts are engaged in the mouths of the jaws the pins 44 strike the shuttle-bar 40, pressing said bar backward against the action of the springs 42, which movement of the shuttle-bar continues until the catch 47 of the dog 45 passes the forward edge of the shuttle and, rising, engages and holds said bar. While the shuttle is being moved, the cracking of the nuts is proceeding between the jaws. As the jaws come together the springs 24 back of the jaw members 19 permit said members to recede, which places the knives 22 in the mouths 16 of the jaws 15, and these knives cut into the ends of the nuts and render the cracking of the nuts thorough. In receding the members 19 of the jaws press against the members 18 and cause the studs 27 to throw the rocking bars 32 backward the distance of the elongated openings 34 of their pivots, when the segments 36 of the rocking bars coming in contact with the toothed wheels 31 the hooks 35 are disengaged from the studs 27 and both members 18 and 19 of the jaws 15 are permitted to recede together, thereby preventing the cracked nut being mashed between the jaws. The movement of the cross-bars 9 9ª is just sufficient to accomplish the cracking of the nuts between the jaws, and as soon as this is accomplished the master-wheel reverses and rotates in the opposite direction, moving the cross-bars apart, during which action the plungers 14 and 25, moving into the mouths of the jaws, discharge any particles of shell lodged therein, and as the cross-bar 9 moves backward the heel 48 of the dog 45 is brought into contact with the set-screw 49 and the dog is tripped, releasing the shuttle-bar 40 and permitting it to be carried forward by the springs 42 to its position beneath and between the ends of the nut-cracking jaws, ready for the reception of another series of nuts to be cracked.

50 and 50ª designate bars extending lengthwise of the machine across and above the nut-cracking jaws and the nut-receiving shuttles 41. These bars are connected at their ends by means of rocker-arms 51, pivoted to cross-bars 52. The forked end of the bar 50 next the driving-pulley 4 carries a roller 50ᵇ, with which a cam 4ª, carried by the rim of the pulley 4, is adapted to engage on each revolution of the driving-pulley 4.

53 is a spring connected to the bar 50 and to one of the cross-bars 52, through means of which the bar 50 is normally held with its roller end projected toward the driving-pulley. Connected to the bars 50 and 50ª are dished jaws 54. These jaws are made in sections, one half of each jaw being formed upon the bar 50 and the other half on the bar 50ª in such a manner that when the sections of the jaws are brought into contact with each other they abut against each other, forming a dish in which the nuts are received singly as they fall from the hopper through the chutes or slideways 39. On each revolution of the driving-pulley 4 the cam 4ª, striking the roller 50ᵇ of the rod 50, causes the rods 50 and 50ª to be moved in opposite directions by reason of their rocker-arm connection, and the nuts received into the dished jaws 54 fall into the shuttles 41 as the sections of the jaws 54 are separated, and thus but a single nut at a time is allowed to fall into each shuttle 41.

I claim as my invention—

1. In a nut-cracking machine, the combination of movable jaw-carriers, nut-cracking jaws supported by said carriers, a reciprocating shuttle-bar carried by one of said jaw-carriers arranged to receive the nuts to be cracked by said jaws, and springs arranged in the rear of said shuttle-bar adapted to project said bar forwardly; substantially as described.

2. In a nut-cracking machine, the combination of movable jaw-carriers, nut-cracking jaws supported by said carriers, a reciprocating shuttle-bar arranged to receive the nuts to be cracked by said jaws, and springs arranged in the rear of said shuttle-bar to project said bar forwardly, means for retracting said shuttle-bar and means for holding it when retracted; substantially as described.

3. In a nut-cracking machine, the combination of nut-cracking jaws suitably supported and arranged to be moved to and from each other, a shuttle-bar arranged to receive the nuts to be cracked by said jaws, means for retracting said shuttle-bar, and a pivoted dog arranged to engage and hold said shuttle-bar when retracted, substantially as described.

4. In a nut-cracking machine, the combination of a supporting-frame, cross-bars arranged to be moved to and from each other, nut-cracking jaws carried by said cross-bars, a shuttle-bar carried by one of said cross-bars arranged to receive the nuts to be cracked by said jaws, springs arranged to press said shuttle-bar forward, pins carried by the opposing cross-bar arranged to carry said shuttle-bar backward, a dog pivoted to said first-mentioned cross-bar, and provided with a hook adapted to engage said shuttle-bar, and a heel adapted to be tripped on the backward movement of said cross-bars, substantially as described.

5. In a nut-cracking machine, the combination of a jaw having a shank, a member loosely mounted on said shank, a nut-receiving member loosely mounted on said first-mentioned member, and a spring located in the rear of said nut-receiving member, and an opposing jaw adapted to approach and recede from said first-mentioned jaw, substantially as described.

6. In a nut-cracking machine, the combination of a jaw having a shank, a member loosely mounted on said shank, a nut-receiving member loosely mounted on said first-mentioned member, a circular knife carried by said first-mentioned member arranged to enter said nut-receiving member, and a spring located in the rear of said nut-receiving member, and an opposing jaw adapted to approach and recede from said first-mentioned jaw, substantially as described.

7. In a nut-cracking machine, the combination of a jaw having a shank, a reciprocally-movable member carried by said jaw, a rocking bar arranged to engage and retain said movable member, a spring arranged to control said rocking bar, and a means for tripping said rocking bar to release it from engagement, and an opposing jaw; substantially as described.

8. In a nut-cracking machine, the combination of a jaw, a second and movably-mounted jaw, means for retaining said second jaw, and means whereby said second jaw is released from the exertion of forward pressure when pressure is brought thereagainst in the act of cracking a nut; substantially as described and for the purpose set forth.

9. In a nut-cracking machine, the combination of a jaw having a shank, a support for said shank, a movable member on said shank, a pivoted rocking bar, a hook carried by said rocking bar adapted to engage said movable member, a toothed segment on the opposite end of said rocking bar, and a pinion carried on said jaw-shank support arranged to engage said segment, substantially as described.

10. In a nut-cracking machine, the combination of jaws having shanks, a support for said shanks, movable members on said shanks, pivoted rocking bars, hooks carried by said rocking bars adapted to engage said movable members, toothed segments on the opposite ends of said rocking bars, a shaft mounted on said jaw-shank support, means for operating said shaft, and pinions carried by said shaft arranged to engage the segments of said rocking bars, substantially as described.

11. In a nut-cracking machine, a jaw, and a circular knife centrally located in said jaw forming a part thereof adapted to cut the shell of the nut in the act of cracking it and an opposing jaw; substantially as described.

12. In a nut-cracking machine, the combination of a jaw provided with a movable yielding member, and a circular knife arranged to be projected through said movable member in the act of cracking a nut for the purpose of cutting the shell of said nut, and an opposing jaw adapted to approach and recede from said first-mentioned jaw, substantially as described.

13. In a nut-cracking machine, the combination of oppositely-arranged reciprocating bars, sectional dished nut-receiving jaws carried by said reciprocating bars, a roller carried by one of said reciprocating bars, and a cam carried by the driving mechanism of the machine arranged to strike said fork for the purpose of operating said bars, substantially as described.

14. In a nut-cracking machine, a jaw comprising an inner member, an outer loosely-mounted nut-receiving member carried by said inner member, and an opposing jaw; substantially as described.

15. In a nut-cracking machine, a jaw having a reciprocally-mounted inner member, and an outer nut-receiving member loosely mounted on said inner member, means for permitting the yielding and causing the return of said outer member, and an opposing jaw; substantially as described.

ROBERT E. WOODSON.

In presence of—
E. S. KNIGHT,
N. FINLEY.